US011950042B2

(12) United States Patent
Chen et al.

(10) Patent No.: US 11,950,042 B2
(45) Date of Patent: Apr. 2, 2024

(54) EARPHONE SYSTEM AND COMMUNICATION METHOD BETWEEN CHARGING BOX AND EARPHONE

(71) Applicant: LUXSHARE-ICT CO., LTD., Taipei (TW)

(72) Inventors: Shr-Min Chen, Taipei (TW); Ta-Yu Lin, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 0 days.

(21) Appl. No.: 17/990,131

(22) Filed: Nov. 18, 2022

(65) Prior Publication Data

US 2023/0077395 A1 Mar. 16, 2023

Related U.S. Application Data

(63) Continuation of application No. 17/378,405, filed on Jul. 16, 2021, now Pat. No. 11,564,028.

(30) Foreign Application Priority Data

Mar. 3, 2021 (CN) ......................... 202110234309.7

(51) Int. Cl.
*H04R 1/10* (2006.01)
*H04R 29/00* (2006.01)

(52) U.S. Cl.
CPC ......... *H04R 1/1041* (2013.01); *H04R 1/1016* (2013.01); *H04R 1/1025* (2013.01); *H04R 29/001* (2013.01)

(58) Field of Classification Search
CPC ............... H04R 1/1016; H04R 1/1025; H04R 2460/17; H02J 7/00034; H02J 7/0044
See application file for complete search history.

(56) References Cited

U.S. PATENT DOCUMENTS 9,769,558 B2 * 9/2017 Chandramohan ...... H04R 5/033
9,843,853 B2 * 12/2017 Hirsch ............. H04W 52/0229
(Continued)

FOREIGN PATENT DOCUMENTS

CN 107887950 A 4/2018
CN 110611348 A * 12/2019
(Continued)

OTHER PUBLICATIONS

U.S. Appl. No. 17/378,405, filed Jul. 16, 2021.

*Primary Examiner* — Ryan Robinson
(74) *Attorney, Agent, or Firm* — Birch, Stewart, Kolasch & Birch, LLP

(57) ABSTRACT

Disclosed is an earphone system. The earphone system includes a charging box and an earphone, which is detachably assembled in the charging box. The charging box includes a processing module provided with a first identification time period, a power outputting module and a first switch module. During the first identification time period when the earphone is connected to the charging box, the earphone system is in a test mode, and the first switch module is switched for the charging box to transmit power to the earphone through the power outputting module and the first switch module. After the earphone is connected to the charging box for more than the first identification time period, the earphone system is in a communication mode, and the first switch module is switched for the charging box to transmit a data signal to the earphone through the processing module and the first switch module.

20 Claims, 10 Drawing Sheets

(56) References Cited

U.S. PATENT DOCUMENTS

| | | | | |
|---|---|---|---|---|
| 10,666,067 | B2 * | 5/2020 | Higgins | H04R 1/1025 |
| 10,687,135 | B1 * | 6/2020 | Palupunoori | H01M 10/623 |
| 11,025,084 | B2 * | 6/2021 | Ding | H02J 7/342 |
| 11,438,962 | B2 * | 9/2022 | Zhong | H02J 7/00032 |
| 2020/0213705 | A1 * | 7/2020 | Ding | H04R 1/1025 |
| 2021/0399564 | A1 * | 12/2021 | Broders | H04R 25/609 |
| 2022/0086553 | A1 * | 3/2022 | Shan | H02J 50/80 |

FOREIGN PATENT DOCUMENTS

| | | | | |
|---|---|---|---|---|
| CN | 209862582 | U | | 12/2019 |
| CN | 210868092 | U | | 6/2020 |
| CN | 112260334 | A | * | 1/2021 |
| CN | 112491100 | A | * | 3/2021 |
| TW | 201720332 | A | | 6/2017 |
| TW | 201724873 | A | | 7/2017 |

* cited by examiner

EARPHONE SYSTEM AND COMMUNICATION METHOD BETWEEN CHARGING BOX AND EARPHONE

CROSS REFERENCE TO RELATED APPLICATION

This application is a Continuation Application of U.S. patent application Ser. No. 17/378,405, filed on Jul. 16, 2021, which claims the priority benefit of Chinese Patent Application Serial Number 202110234309.7, filed on Mar. 3, 2021. These and all other referenced extrinsic materials are incorporated herein by reference in their entirety.

BACKGROUND

Technical Field

The present disclosure relates to the technical field of communication technology for earphones, and more particularly to an earphone system and a communication method between a charging box and an earphone.

Related Art

At present, the contact between the pogo pins is generally used in the market to realize the physical connection between a charging box and an earphone.

When the earphone is put into the charging box and the charging box intends to charge the earphone, the charging box transmits power to the battery of the earphone through the pogo pins of the charging box and the earphone, so as to achieve the purpose of charging the earphone battery.

When the earphone is put into the charging box and the charging box wants to communicate with the earphone, there are two methods currently used to realize the communication between the charging box and the earphone. In the first method, the extra interfaces/pogo pins are added to the charging box and the earphone for communication, but there are problems of increasing the structural complexity of the charging box and the earphone, and increasing the manufacturing cost. In the second method, the communication chips are added to the charging box and the earphone for communication, but there are problems of high cost and excessive volume.

Therefore, there is an important issue needed to be resolved urgently that how to realize the communication between the earphone and the charging box based on the existing pogo pins.

SUMMARY

The main purpose of the present disclosure is to provide an earphone system and a communication method between a charging box and an earphone, so as to solve the problems in the prior art of increasing the complexity of the structure of the charging box and the earphone and increasing the manufacturing cost due to the addition of the extra interfaces/pogo pins to the charging box and the earphone for communication, or the problems of high cost and excessive volume caused by adding communication chips to the charging box and the earphone for communication.

In order to achieve the above objectives, the present disclosure is implemented as follows:

According to a first aspect of embodiments of the present disclosure, an earphone system is provided. The earphone system includes a charging box and an earphone. The earphone is detachably assembled in the charging box. The charging box includes a processing module, a power outputting module, a first switch module and an output interface, wherein the processing module is provided with a first identification time period, the power outputting module is electrically connected to the processing module, and the first switch module is electrically connected to the processing module and the power outputting module. The earphone includes a core module, a second switch module and a connection interface, wherein the second switch module is electrically connected to the core module, and the connection interface is electrically connected to the second switch module and is selectively electrically connected to the output interface. The earphone system includes a test mode and a communication mode. During the first identification time period when the earphone is electrically connected to the charging box, the earphone system is in the test mode, and the first switch module is switched to allow the charging box to transmit power to the earphone through the power outputting module and the first switch module. After the earphone is electrically connected to the charging box for more than the first identification time period, the earphone system is in the communication mode, and the first switch module is switched to allow the charging box to transmit a data signal to the earphone through the processing module and the first switch module.

According to a second aspect of embodiments of the present disclosure, a communication method between a charging box and an earphone is provided. The communication method includes the following steps of: putting the earphone into the charging box, and electrically connecting the earphone to the charging box; during a first identification time period when the earphone is electrically connected to the charging box, the earphone system including the earphone and the charging box being in a test mode, and switching a first switch module in the charging box to allow the charging box to transmit power to the earphone; switching a second switch module in the earphone to allow the earphone to receive the power when the earphone system being in the test mode; after the earphone being electrically connected to the charging box for more than the first identification time period, switching the earphone system to be in a communication mode, and switching the first switch module in the charging box to allow the charging box to transmit a data signal to the earphone; and switching the second switch module in the earphone to allow the earphone to receive the data signal and transmit the data signal to an external device when the earphone system being in the communication mode.

According to a third aspect of embodiments of the present disclosure, a communication method between a charging box and an earphone is provided. The communication method includes the following steps of: putting the earphone into the charging box, and electrically connecting the earphone to the charging box; during a first identification time period when a hall sensing unit of the earphone senses a magnetic field of a magnetic unit in the charging box, the earphone system including the earphone and the charging box being in a test mode, and switching a first switch module in the charging box to allow the charging box to transmit power to the earphone; switching a second switch module in the earphone to allow the earphone to receive the power when the earphone system being in the test mode: after the hall sensing unit of the earphone senses the magnetic field of the magnetic unit in the charging box for more than the first identification time period, switching the earphone system to be in a communication mode, and switching the first switch module in the charging box to allow the charging box to transmit a data signal to the earphone; and switching the second switch module in the earphone to allow the earphone to receive the data signal and transmit the data signal to an external device when the earphone system being in the communication mode.

In the embodiments of the present disclosure, during the first identification time period when the earphone is electrically connected to the charging box, the earphone system is in the test mode, and the first switch module is switched for the charging box to transmit power to the earphone; and after the earphone is electrically connected to the charging box for more than the first identification time period, the earphone system is in the communication mode, and the first switch module is switched for the charging box to transmit data signals to the earphone. Therefore, the charging box can communicate with the earphone based on the existing pogo pins used for charging by only switching the first switch module.

It should be understood, however, that this summary may not contain all aspects and embodiments of the present disclosure, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
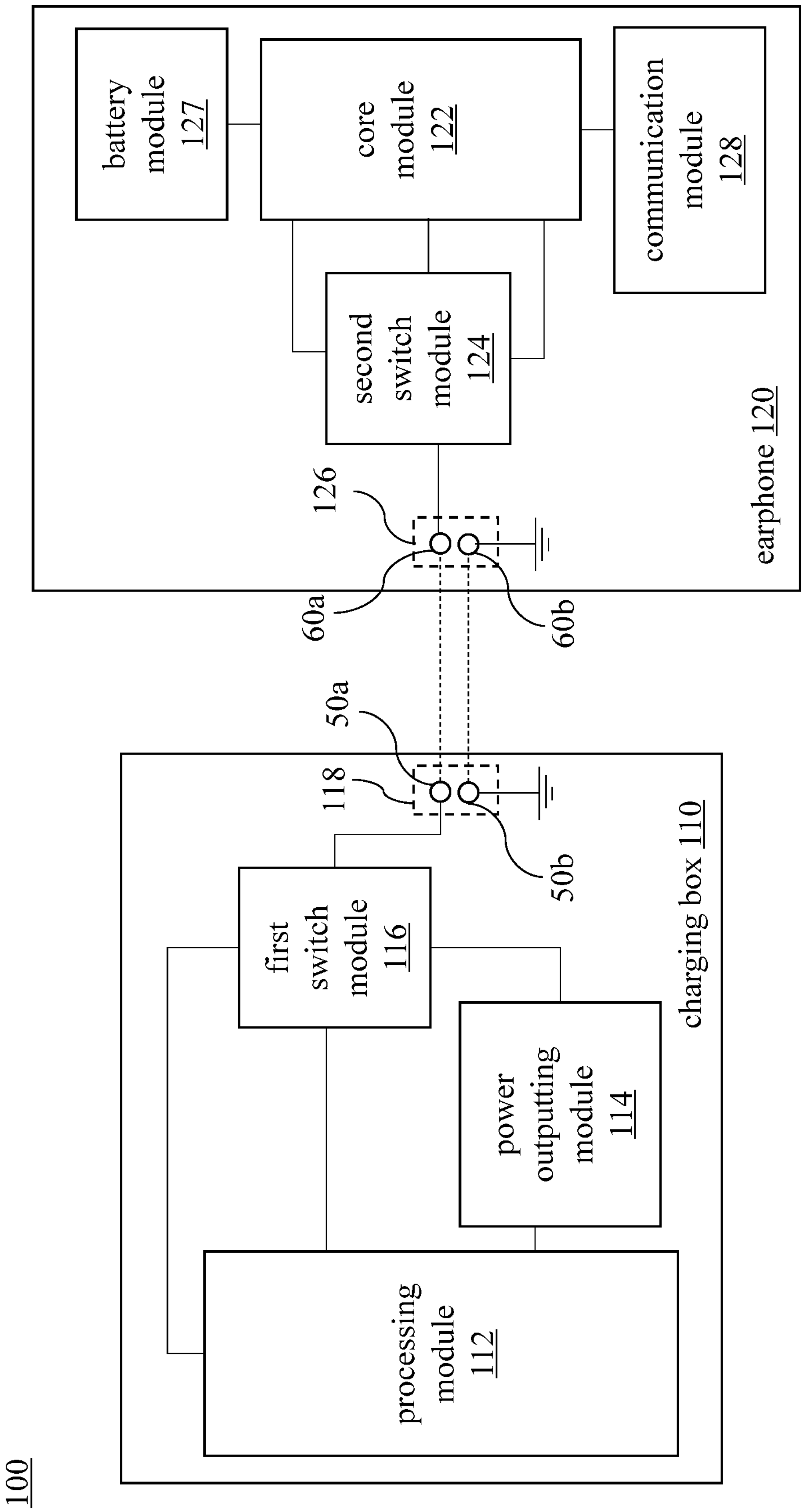
FIG. 1 is a block diagram of an embodiment of an earphone system according to the present disclosure.

The present disclosure will now be described more fully hereinafter with reference to the accompanying drawings, in which exemplary embodiments of the invention are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". Therefore, a process, method, object, or device that comprises a series of elements not only include these elements, but also comprises other elements not specified expressly, or may include inherent elements of the process, method, object, or device.

It will be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element.

The following description is of the best-contemplated mode of carrying out the invention. This description is made for the purpose of illustration of the general principles of the invention and should not be taken in a limiting sense. The scope of the invention is best determined by reference to the appended claims.

In the following embodiment, the same reference numerals are used to refer to the same or similar elements throughout the invention.

Please refer to FIG. 1, which is a block diagram of an embodiment of an earphone system according to the present disclosure. As shown in FIG. 1, in this embodiment, the earphone system 100 comprises a charging box 110 and an earphone 120. The earphone 120 is detachably assembled in the charging box 110. The charging box 110 comprises a processing module 112, a power outputting module 114, a first switch module 116 and an output interface 118, wherein power outputting module 114 is electrically connected to processing module 112, the first switch module 116 is electrically connected to processing module 112 and power outputting module 114. The earphone 120 comprises a core module 122, a second switch module 124, and a connection interface 126, wherein the second switch module 124 is electrically connected to the core module 122, and the connection interface 126 is electrically connected to the second switch module 124 and is selectively electrically connected to the output interface 118. The processing module 112, the power outputting module 114, the first switch module 116, the core module 122, and the second switch module 124 can be implemented in various ways, including software, hardware, firmware, or any combination thereof. The output interface 118 comprises pogo pins 50*a*, 50*b*, wherein the pogo pin 50*a* is electrically connected to the first switch module 116, and the pogo pin 50*b* is grounded. The connection interface 126 comprises pogo pins 60*a*, 60*b*, wherein the pogo pin 60*a* is electrically connected to the second switch module 124, and the pogo pin 60*b* is grounded.

The software or firmware of the technology used in the implementation can be stored in a machine-readable storage medium, such as a read-only memory (ROM), a random access memory (RAM), a magnetic disk storage medium, an optical storage medium and a flash memory, and can be executed by one or more general-purpose or special-purpose programmable microprocessor(s). The signals and/or power can transmitted between the power outputting module 114 and the processing module 112, between the first switch module 116 and the processing module 112, between the first switch module 116 and the power outputting module 114, the second switch module 124 and the core module 122 and between the connection interface 126 and the second switch module 124 in a wireless or wired manner.

In an embodiment, the earphone 120 may be, but is not limited to, a true wireless stereo (TWS) earphone.

In this embodiment, the processing module 112 is provided with a first identification time period T1. The first identification time period T1 can be, but is not limited to, between 100 milliseconds (ms) and 300 ms. The embodiments is not intended to limit the present disclosure, and the actual first identification time period T1 can be adjusted according to actual needs. In addition, the processing module 112 can be further used to control the power outputting module 114, so that the power outputting module 114 outputs power to the first switch module 116.

Figure 2:
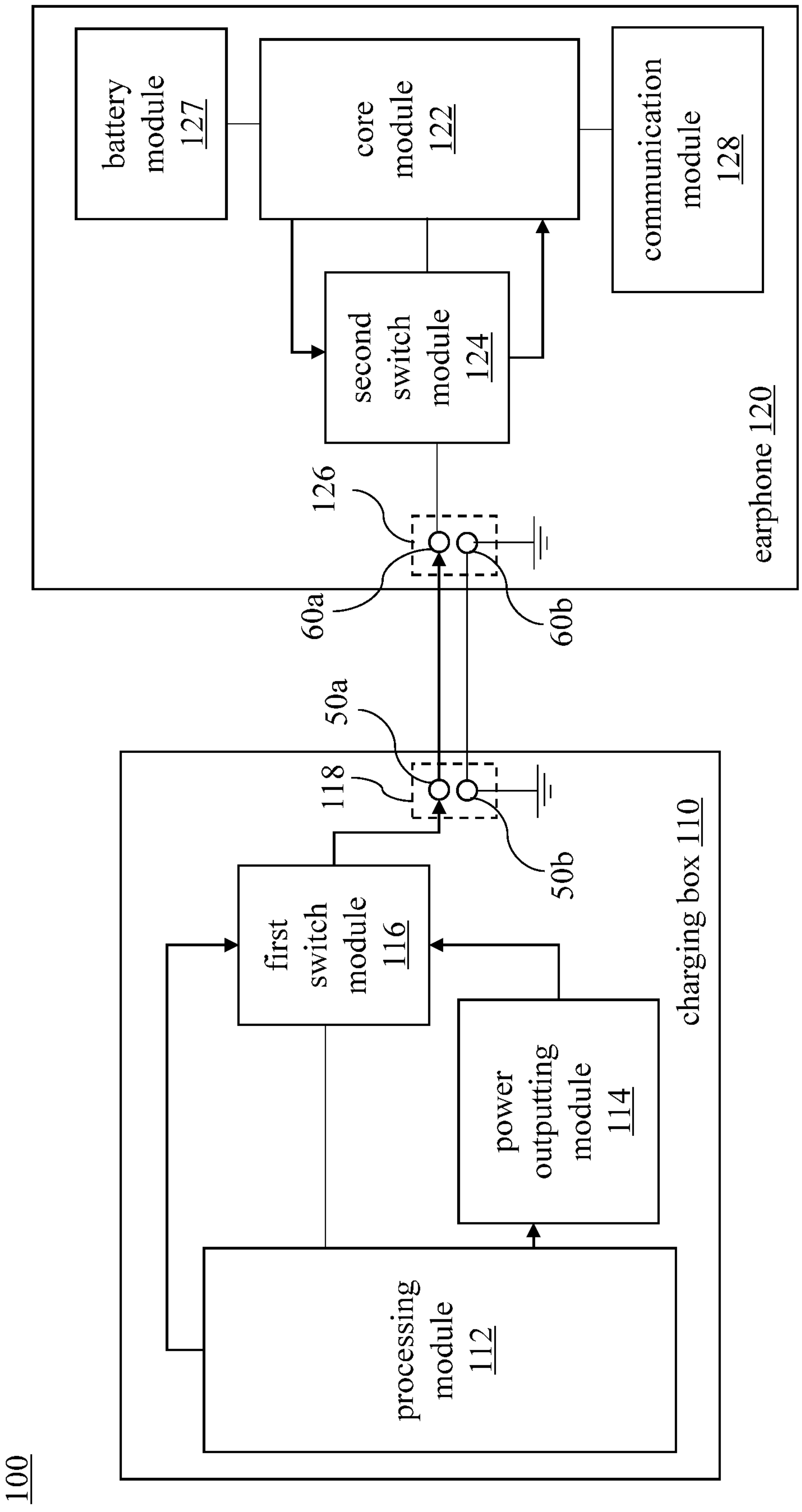
FIG. 2 is a block diagram of an embodiment of the earphone system of FIG. 1 in a test mode.

In this embodiment, the earphone system 100 includes a test mode and a communication mode. Please refer to FIG. 2, which is a block diagram of an embodiment of the earphone system of FIG. 1 in a test mode. As shown in FIG. 2, during the first identification time period T1 when the earphone 120 is electrically connected to the charging box 110, the earphone system 100 is in the test mode, and the first switch module 116 is switched to allow the charging box 110 to transmit the power to the earphone 120 through the power outputting module 114 and the first switch module 116.

Furthermore, when the earphone system 100 is in the test mode, the processing module 112 controls the first switch module 116 to make the output interface 118 output the power transmitted by the power outputting module 114 through the first switch module 116, and the core module 122 controls the second switch module 124 to make the connection interface 126 receive the power from the output interface 118 and transmit the power to the core module 122 through the second switch module 124.

In more detail, the charging box 110 may comprise a timer (which is not shown) or a unit or circuit with a timing function may be disposed in the processing module 112. Therefore, when the earphone 120 is put into the charging box 110 (i.e., the earphone 120 is electrically connected to the charging box 110), the charging box 110 detects the voltage level variation on the pogo pin 50*a*. For example, when the voltage level detected by the charging box 110 drops in a preset range, the timing mechanism is activated, the earphone system 100 is in the test mode, the processing module 112 outputs a detection signal to the power outputting module 114 to make the power outputting module 114 output the power, and the processing module 112 outputs a control signal to the first switch module 116 to switch the first switch module 116, so that the power output by the power outputting module 114 is transmitted to the earphone 120 through the first switch module 116 and the pogo pin 50*a*. When the charging box 110 determines that the earphone 120 is electrically connected to the charging box 110 during the first identification time period T1 based on the timer, the charging box 110 continuously transmits the power to the earphone 120 through the power outputting module 114 and the first switch module 116. The earphone 120 may comprise another timer (which is not shown) or a unit or circuit with a timing function may be disposed in the core module 122. When the earphone 120 is put into the charging box 110 (i.e., the earphone 120 is electrically connected to the charging box 110), the earphone 120 detects the voltage level variation on the pogo pin 60*a*. For example, when the voltage level detected by the earphone 120 rises to another preset range, the another timing mechanism is activated, the core module 122 outputs a control signal to the second switch module 124 to switch the second switch module 124 to make the power output from the charging box 110 be transmitted to the core module 122 through the pogo pin 60*a* and the second switch module 124. When the earphone 120 determines that the earphone 120 is electrically connected to the charging box 110 during the first identification time period T1 based on the another timer, the earphone 120 continuously receives the power through the pogo pin 60*a* and the second switch module 124.

In an embodiment, the earphone 120 may further comprise a battery module 127, which is electrically connected to the core module 122, and the battery module 127 stores the power received by the core module 122.

Figure 3:
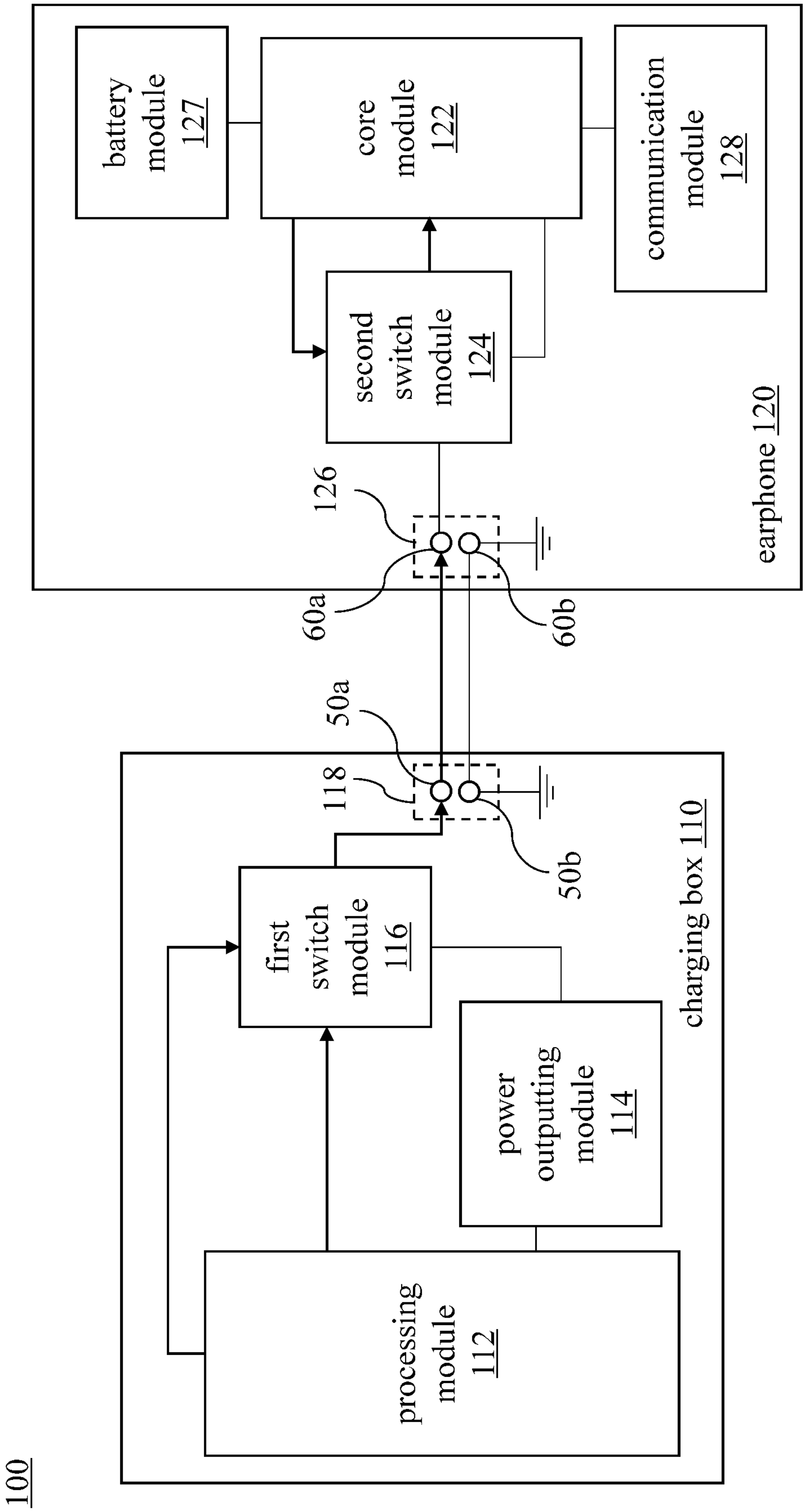
FIG. 3 is a block diagram of an embodiment of the earphone system of FIG. 1 in a communication mode.

Please refer to FIG. 3, which is a block diagram of an embodiment of the earphone system of FIG. 1 in a communication mode. As shown in FIG. 3, after the earphone 120 is electrically connected to the charging box 110 for more than the first identification time period T1, the earphone system 100 is in the communication mode, the first switch module 116 is switched to allow the charging box 110 to transmit the data signal to the earphone 120 through the processing module 112 and the first switch module 116.

Furthermore, when the earphone system 100 is in the communication mode, the processing module 112 controls the first switch module 116 to make the output interface 118 output the data signal transmitted by the processing module 112 through the first switch module 116. The core module 122 controls the second switch module 124 to make the connection interface 126 receive the data signal from the output interface 118, and transmit the data signal to the core module 122 through the second switch module 124.

In more detail, the charging box 110 may comprise a timer (which is not shown). When the charging box 110 determines that the earphone 120 is electrically connected to the charging box 110 for more than the first identification time period T1 based on the timer, the earphone system 100 is switched from the test mode to the communication mode, and the processing module 112 outputs a data signal to the first switch module 116 and at the same time outputs another control signal to switch the first switch module 116 to make the data signal output by the processing module 112 be transmitted to the earphone 120 through the first switch module 116 and the pogo pin 50*a*. The earphone 120 may comprise another timer (which is not shown). When the earphone 120 can determine that the earphone 120 is put into the charging box 110 for more than the first identification time period T1 based on the another timer, the core module 122 outputs a control signal to the second switch module 124 to switch the second switch module 124 to make the data signal output by the charging box 110 be transmitted to the core module 122 through the pogo pin 60*a* and the second switch module 124. The data signal may comprise, but is not limited to, the current remaining electric quantity of the charging box 110.

Figure 4:
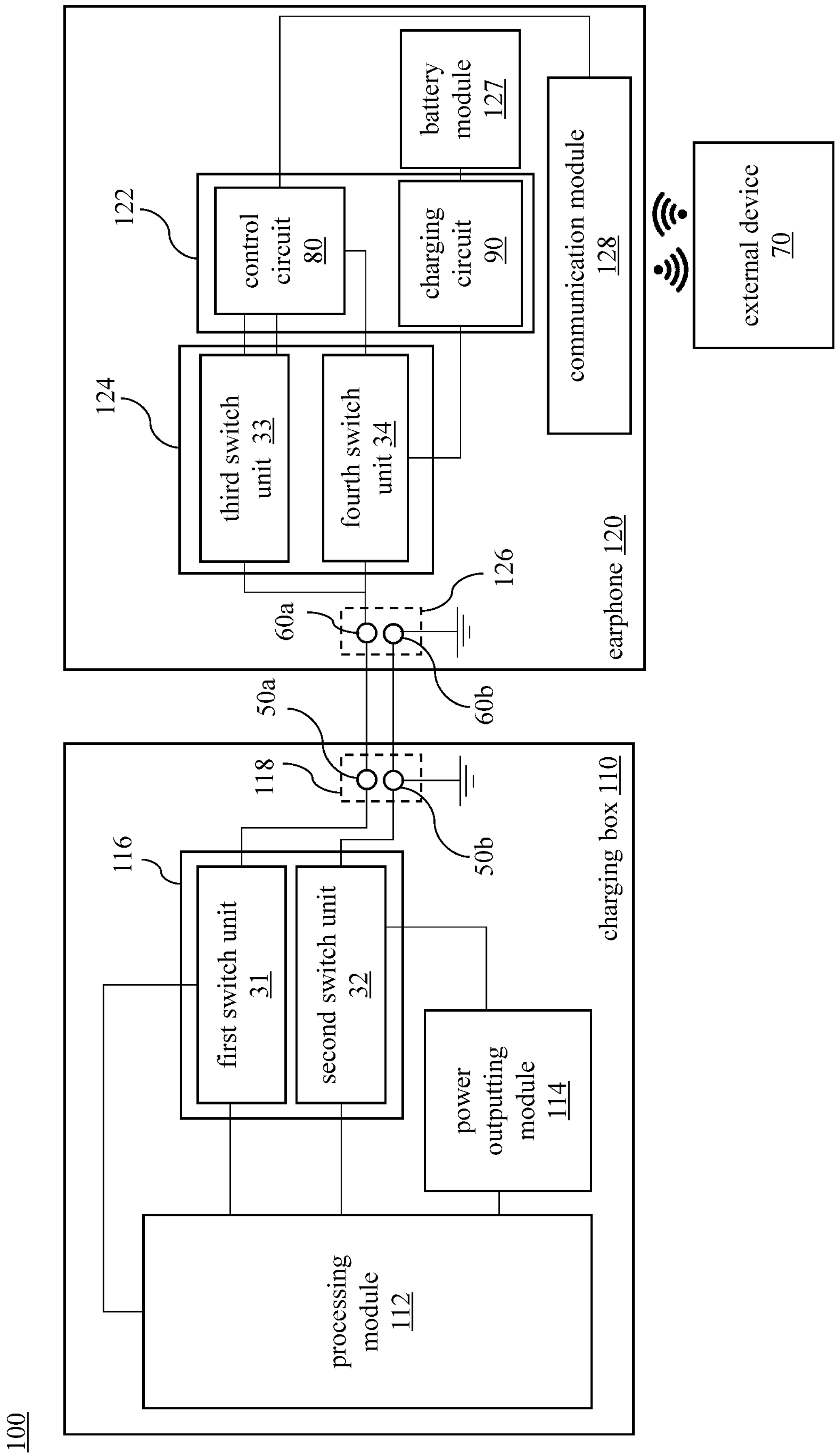
FIG. 4 is a block diagram of another embodiment of an earphone system according to the present disclosure.

Please refer to FIG. 4, which is a block diagram of another embodiment of an earphone system according to the present disclosure. As shown in FIG. 4, in addition to the core module 122, the second switch module 124, and the connection interface 126, the earphone 120 may further comprise a communication module 128, which is electrically connected to the core module 122, and the communication module 128 transmits the data signal received by the core module 122 to an external device 70. For example, when the data signal comprises the current remaining electric quantity of the charging box 110 and the earphone 120 can be connected to a smartphone or a computing device (i.e., the external device 70) through the communication module 128, the earphone 120 can transmit the data signal to the smart phone or the computing device for presentation, so that the user can know the current remaining electric quantity of the charging box 110.

In this embodiment, the core module 122 may comprise a control circuit 80 and a charging circuit 90. The control circuit 80 controls the second switch module 124 and receives the data signal. The charging circuit 90 is electrically connected to the battery module 127 and receives the power to make the battery module 127 store the power.

In this embodiment, the charging box 110 comprises the processing module 112, the power outputting module 114, the first switch module 116, and the output interface 118. The first switch module 116 may comprise a first switch unit 31 and a second switch unit 32. The first switch unit 31 is electrically connected to the processing module 112 and the output interface 118. The second switch unit 32 is electrically connected to the processing module 112, the power outputting module 114 and the output interface 118. The processing module 112 controls turning-on and turning-off of the first switch unit 31 and the second switch unit 32. The second switch module 124 may comprise a third switch unit 33 and a fourth switch unit 34. The third switch unit 33 and the fourth switch unit 34 are electrically connected to the core module 122 and the connection interface 126 respectively. The core module 122 controls turning-on and turning-off of the third switch unit 33 and the fourth switch unit 34. The first switch unit 31, the second switch unit 32, the third switch unit 33, and the fourth switch unit 34 may be, but are not limited to, transistors.

When the earphone system 100 is in the test mode, the processing module 112 turns off the first switch unit 31 and turns on the second switch unit 32, so that the output interface 118 outputs the power transmitted by the power outputting module 114 through the second switch unit 32: and the core module 122 turns off the third switch unit 33 and turns on the fourth switch unit 34, so that the connection interface 126 receives the power from the output interface 118 and transmits the power to the core module 122 through the fourth switch unit 34.

When the earphone system 100 is in the communication mode, the processing module 112 turns on the first switch unit 31 and turns off the second switch unit 32, so that the output interface 118 outputs the data signal transmitted by the processing module 112 through the first switch unit 31; and the core module 122 turns on the third switch unit 33 and turns off the fourth switch unit 34, so that the connection interface 126 receives the data signal from the output interface 118, and transmits the data signal to the core module 122 through the third switch unit 33.

Figure 5:
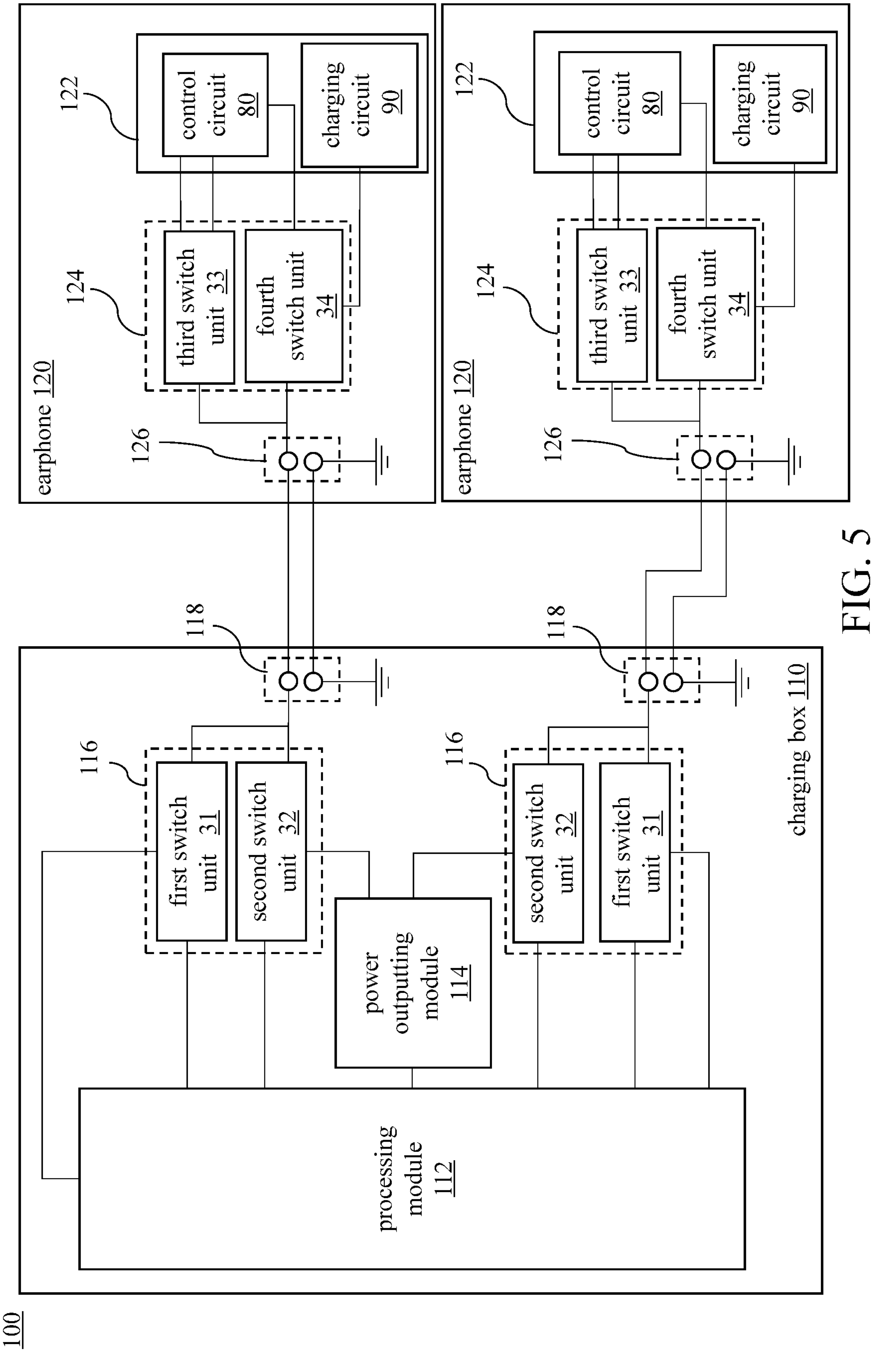
FIG. 5 is a block diagram of another embodiment of an earphone system according to the present disclosure.

Please refer to FIG. 5, which is a block diagram of another embodiment of an earphone system according to the present disclosure. As shown in FIG. 5, the earphone system 100 may comprise N earphones 120, and the charging box 110 may further comprise N first switch modules 116 and N output interfaces 118. Each of the N first switch modules 116 is electrically connected to the processing module 112 and the power outputting module 114, and the N first switch modules 116 are electrically connected to the N output interfaces 118 in a one-to-one relationship, wherein N is an integer greater than or equal to 2. In this embodiment, the number of earphones 120 is two (i.e., N=2), but this embodiment is not intended to limit the present disclosure. When the earphone system 100 comprises a plurality of earphones 120, the charging and communication methods between the charging box 110 and each earphone 120 are the same as the above-mentioned embodiment, and the detailed description has been illustrated in the above paragraphs, which is not repeated hereinafter.

Figure 6:
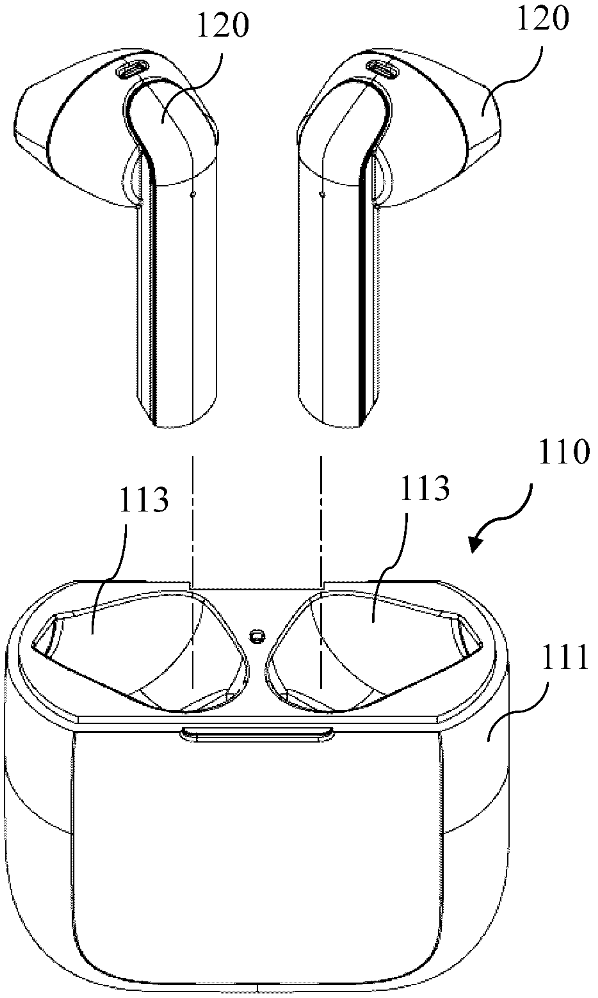
FIG. 6 is a schematic diagram of an embodiment in which the earphone and the charging box of FIG. 5 are separated.
Figure 7:
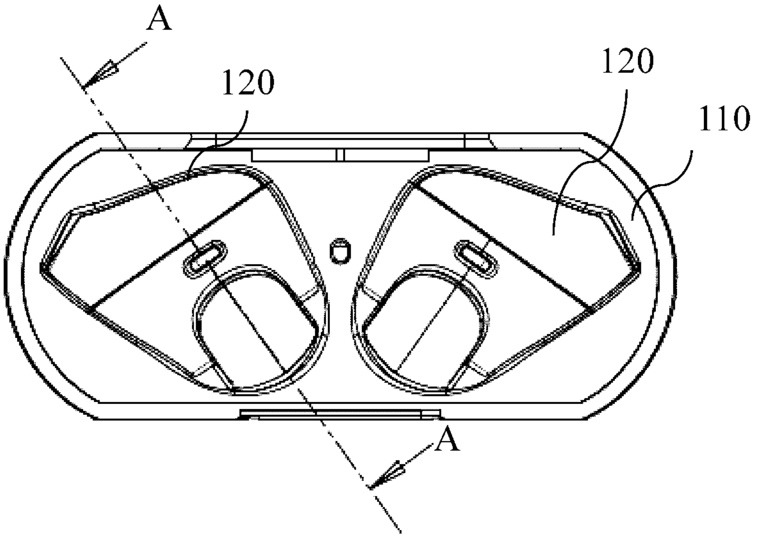
FIG. 7 is a top view of an embodiment of the earphone of FIG. 6 put into the charging box.
Figure 8:
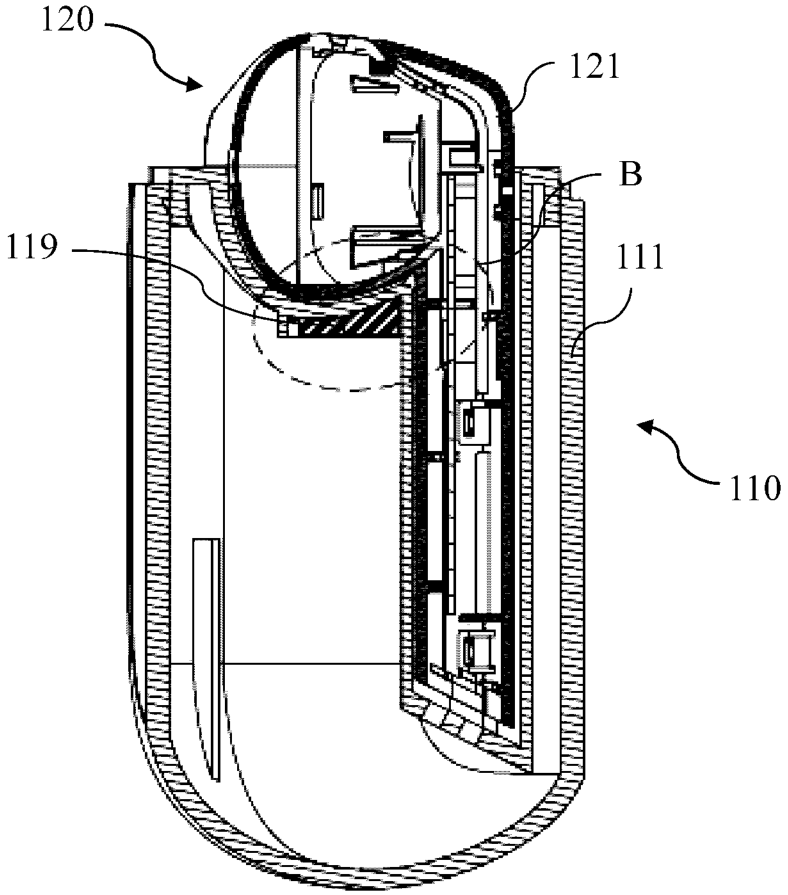
FIG. 8 is a sectional view along line A-A in FIG. 7.
Figure 9:
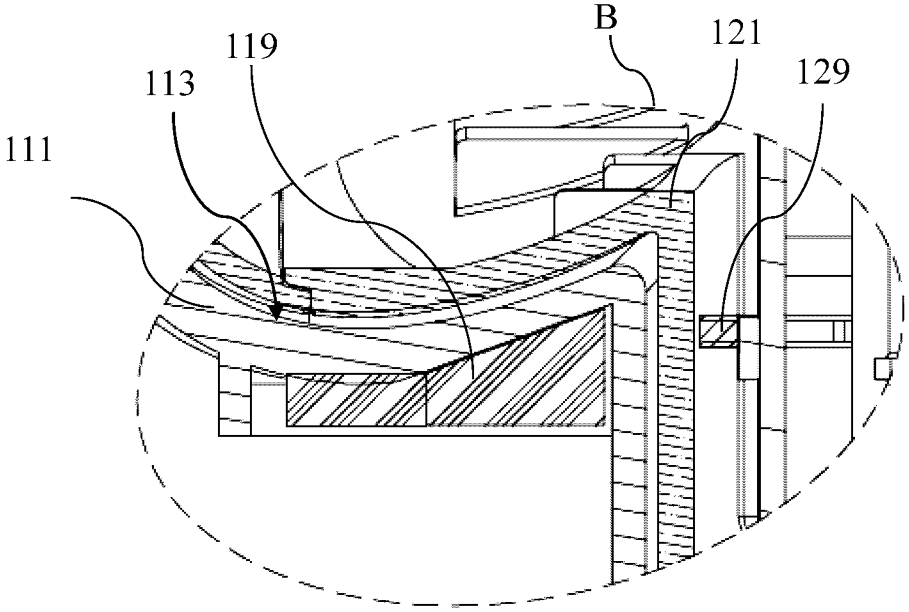
FIG. 9 is an enlarged schematic diagram of block B in FIG. 8.

Please refer to FIGS. 6-9. FIG. 6 is a schematic diagram of an embodiment in which the earphone and the charging box of FIG. 5 are separated, FIG. 7 is a top view of an embodiment of the earphone of FIG. 6 put into the charging box, FIG. 8 is a sectional view along line A-A in FIG. 7, and FIG. 9 is an enlarged schematic diagram of block B in FIG. 8. As shown in FIGS. 6 to 9, the charging box 110 may further comprise a magnetic unit 119, and the earphone 120 may further comprise a hall sensing unit 129. The hall sensing unit 129 is electrically connected to the core module 122. When the magnetic field of the magnetic unit 119 is sensed by the hall sensing unit 129, it represents that the output interface 118 is electrically connected to the connection interface 126.

In more detail, the magnetic unit 119 is disposed around the accommodating slot 113 of the charging box 110, which adapts to the earphone 120, and is disposed in the housing 111 of the charging box 110. The hall sensing unit 129 is disposed in the housing 121 of the earphone 120, and the setting position thereof corresponds to the position of the accommodating slot 113, so that when the earphone 120 is put into the charging box 110, the setting position of the hall sensing unit 129 corresponds to that of the magnetic unit 119 to make the earphone 120 determine that it is electrically connected to the charging box 110 by sensing the magnetic field of the magnetic unit 119 through the hall sensing unit 129, in addition to the detection of the voltage level variation on the pogo pin 60*a*.

Please refer to FIG. 2, in addition to the test mode and the communication mode, the earphone system 100 may further include a charging mode, and the processing module 112 may be further provided with a second identification time period T2. After the second identification time period T2 after the output interface 118 of the charging box 110 outputs the data signal, the earphone system 100 is switched to the charging mode, and the first switch module 116 is switched to make the output interface 118 continue to output the power to the connection interface 126. The second identification time period T2 may be, but is not limited to, between 100 ms and 1000 ms, but this embodiment is not used to limit the present disclosure. The actual second identification time period T2 can be adjusted according to actual needs.

Furthermore, when the earphone system 100 is in the charging mode, the processing module 112 controls the first switch module 116 to make the output interface 118 output the power transmitted by the power outputting module 114 through the first switch module 116, and the core module 122 controls the second switch module 124 to make the connection interface 126 receive the power from the output interface 118 and transmit the power to the core module 122 through the second switch module 124.

In more detail, the charging box 110 may comprise a timer (which is not shown) or a unit or circuit with a timing function may be disposed in the processing module 112, and the charging box 110 may determine that after the second identification time period T2 after the output interface 118 of the charging box 110 outputs the data signal (that is, it is determined that the earphone 120 is put into the charging box 110 for more than the time period T1+T2) based on the timer, the earphone system 100 is switched from the communication mode to the charging mode, the processing module 112 outputs a charging signal to the power outputting module 114 to enable the power outputting module 114 to output the power, and the processing module 112 outputs a control signal to the first switch module 116 to switch the first switch module 116 to make the power output by the power outputting module 114 be transmitted to the earphone 120 through the first switch module 116 and the pogo pin 50*a*; and the core module 122 outputs a control signal to the second switch module 124 to switch the second switch module 124 to make the power output by the charging box 110 be transmitted to the core module 122 through the pogo pin 60 a and the second switch module 124, and the battery module 127 stores the power received by the core module 122.

Figure 10:
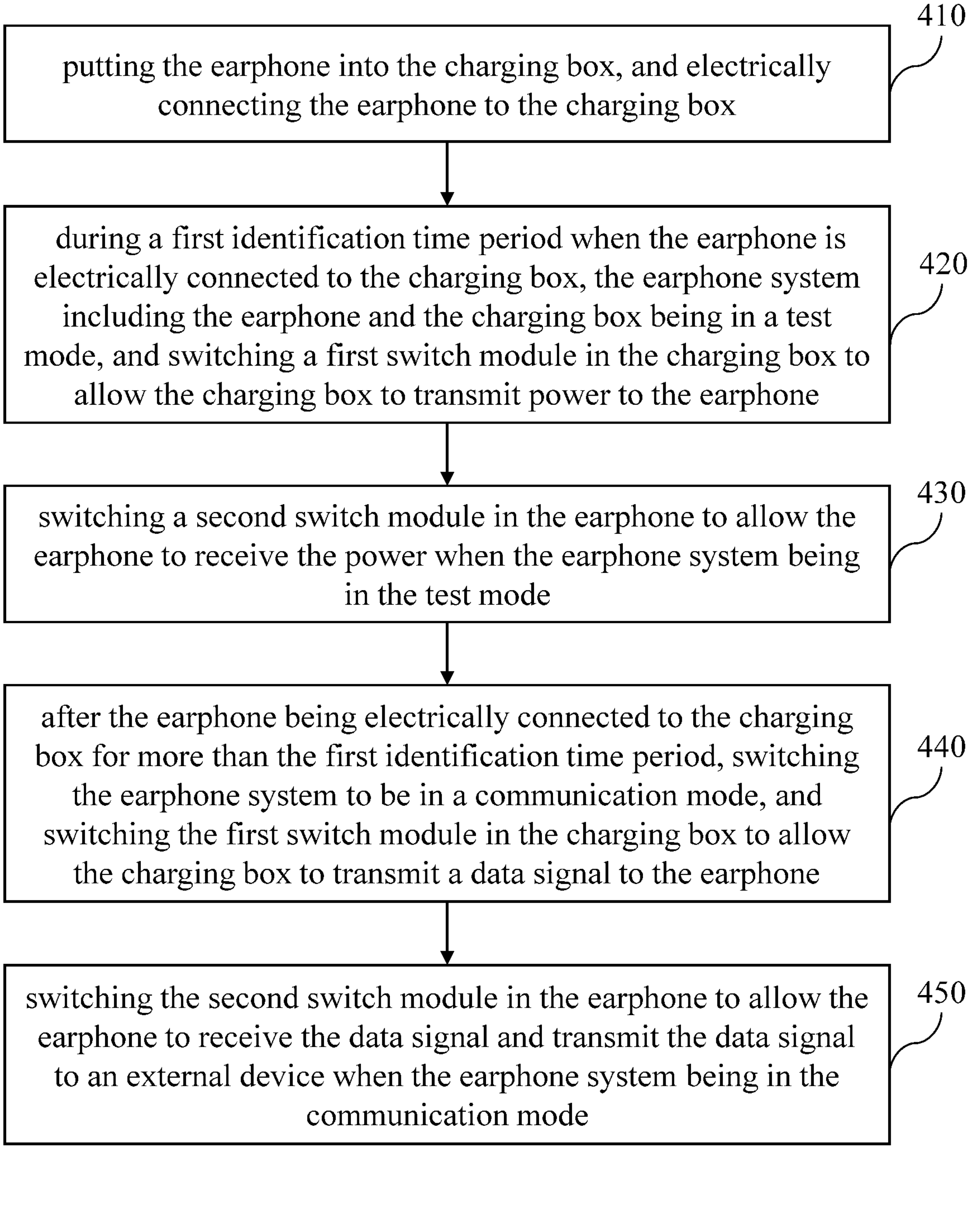
FIG. 10 is a flowchart of a first embodiment of a communication method between a charging box and an earphone according to the present disclosure.

Please refer to FIG. 10, which is a flowchart of a first embodiment of a communication method between a charging box and an earphone according to the present disclosure. In this embodiment, the communication method between the charging box and the earphone comprises the following steps of: putting the earphone into the charging box, and electrically connecting the earphone to the charging box (step 410); during a first identification time period when the earphone is electrically connected to the charging box, the earphone system including the earphone and the charging box being in a test mode, and switching a first switch module in the charging box to allow the charging box to transmit power to the earphone (step 420); switching a second switch module in the earphone to allow the earphone to receive the power when the earphone system being in the test mode (step 430); after the earphone being electrically connected to the charging box for more than the first identification time period, switching the earphone system to be in a communication mode, and switching the first switch module in the charging box to allow the charging box to transmit a data signal to the earphone (step 440): and switching the second switch module in the earphone to allow the earphone to receive the data signal and transmit the data signal to an external device when the earphone system being in the communication mode (step 450).

By the above steps, after the charging box is electrically connected to the earphone for more than the first identification time period, the earphone system is in the communication mode, and the first switch module is switched for the charging box to transmit the data signal to the earphone. Therefore, the charging box can communicate with the earphone based on the existing pogo pins used for charging only by switching the first switch module. In addition, the data signal can also be transmitted to the external device through the earphone for presentation, so that the user can know the relevant information of the charging box. For example, the data signal may comprise the current remaining electric quantity of the charging box. The detailed description has been illustrated in the above paragraphs, which is not repeated hereinafter.

Figure 11:
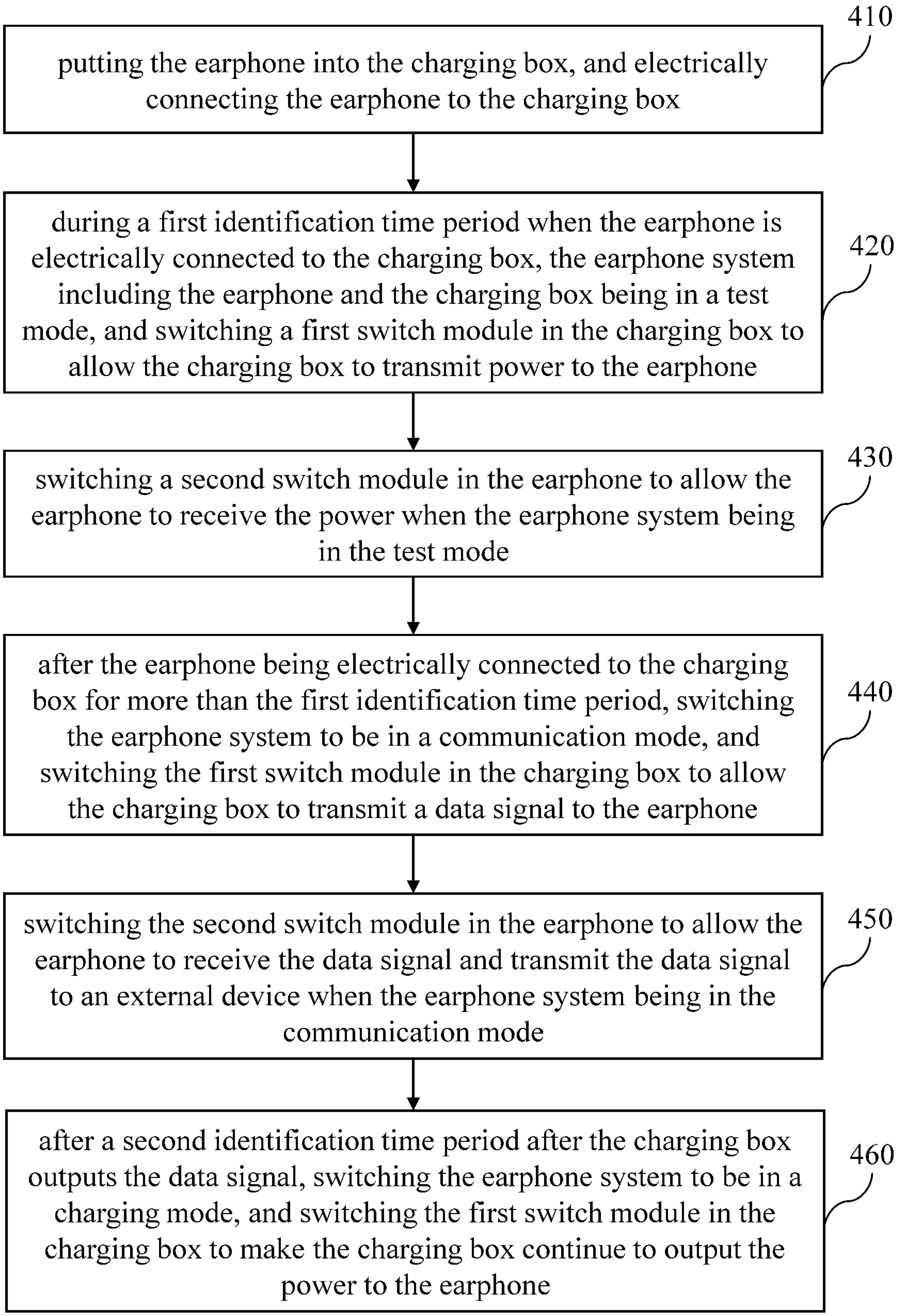
FIG. 11 is a flowchart of a second embodiment of a communication method between a charging box and an earphone according to the present disclosure.

In one embodiment, please refer to FIG. 11, which is a flowchart of a second embodiment of a communication method between a charging box and an earphone according to the present disclosure. As shown in FIG. 11, in addition to the above mentioned steps 410 to 450, the communication method between the charging box and the earphone further comprises the following steps of: after a second identification time period after the charging box outputs the data signal, switching the earphone system to be in a charging mode, and switching the first switch module in the charging box to make the charging box continue to output the power to the earphone (step 460). The detailed description has been illustrated in the above paragraphs, which is not repeated hereinafter.

In an embodiment, the first switch module comprises a first switch unit and a second switch unit, the first switch unit is used to control the transmission of the data signal, and the second switch unit is used to control the transmission of the power. When the earphone system is in the test mode, the charging box turns off the first switch unit and turns on the second switch unit. When the earphone system is in the communication mode, the charging box turns on the first switch unit and turns off the second switch unit. The detailed description has been illustrated in the above paragraphs, which is not repeated hereinafter.

In an embodiment, the second switch module comprises a third switch unit and a fourth switch unit, the third switch unit is used to control the transmission of the data signal, and the fourth switch unit is used to control the transmission of the power. When the earphone system is in the test mode, the earphone turns off the third switch unit and turns on the fourth switch unit. When the earphone system is in the communication mode, the earphone turns on the third switch unit and turns off the fourth switch unit. The detailed description has been illustrated in the above paragraphs, which is not repeated hereinafter.

Figure 12:
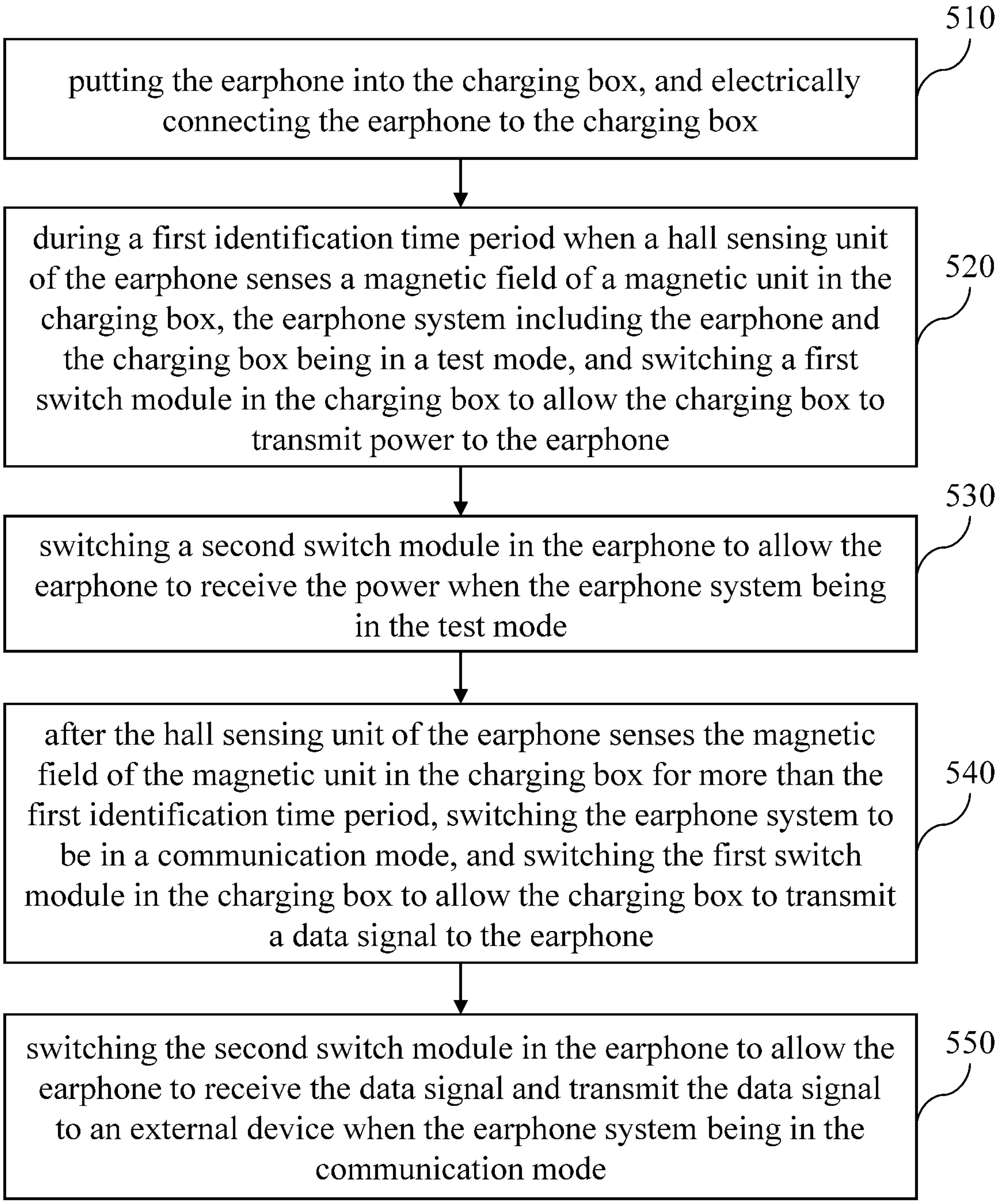
FIG. 12 is a flowchart of a third embodiment of a communication method between a charging box and an earphone according to the present disclosure.

In one embodiment, please refer to FIG. 12, which is a flowchart of a third embodiment of a communication method between a charging box and an earphone according to the present disclosure. As shown in FIG. 12, the communication method between the charging box and the earphone comprises the following steps of: putting the earphone into the charging box, and electrically connecting the earphone to the charging box (step 510); during a first identification time period when a hall sensing unit of the earphone senses a magnetic field of a magnetic unit in the charging box, the earphone system including the earphone and the charging box being in a test mode, and switching a first switch module in the charging box to allow the charging box to transmit power to the earphone (step 520); switching a second switch module in the earphone to allow the earphone to receive the power when the earphone system being in the test mode (step 530); after the hall sensing unit of the earphone senses the magnetic field of the magnetic unit in the charging box for more than the first identification time period, switching the earphone system to be in a communication mode to switch the first switch module in the charging box to allow the charging box to transmit a data signal to the earphone (step 540); and switching the second switch module in the earphone to allow the earphone to receive the data signal and transmit the data signal to an external device when the earphone system being in the communication mode (step 550).

By the above steps, the earphone can sense the magnetic field of the magnetic unit through the hall sensing unit to determine that it is electrically connected to the charging box. In addition, the charging box can communicate with the earphone based on the existing pogo pins used for charging only by switching the first switch module. Moreover, the data signal can also be transmitted to the external device through the earphone for presentation, so that the user can know the relevant information of the charging box. The detailed description has been illustrated in the above paragraphs, which is not repeated hereinafter.

In summary, in the embodiments of the earphone system and the communication method between the charging box and the earphone of the present disclosure, during the first identification time period when the earphone is electrically connected to the charging box, the earphone system is in the test mode, and the first switch module is switched for the charging box to transmit power to the earphone; and after the earphone is electrically connected to the charging box for more than the first identification time period, the earphone system is in the communication mode, and the first switch module is switched for the charging box to transmit data signals to the earphone. Therefore, the charging box can communicate with the earphone based on the existing pogo pins used for charging by only switching the first switch module. In addition, the data signal can also be transmitted to the external device through the earphone for presentation, so that the user can know the relevant information of the charging box.

Although the embodiment has been described as having specific elements in the figures in the present disclosure, it should be noted that additional elements may be included to achieve better performance without departing from the spirit of the invention.

While the invention has been described by way of example and in terms of the preferred embodiments, it should be noted that the invention is not limited to the disclosed embodiments. On the contrary, it is intended to cover various modifications and similar arrangements apparent to those skilled in the art. Therefore, the scope of the appended claims should be accorded the broadest interpretation so as to encompass all such modifications and similar arrangements.

What is claimed is:

1. An earphone system, which comprising:

a charging box, comprising:

- a processing module provided with a first identification time period;
- a power outputting module electrically connected to the processing module;
- a first switch module electrically connected to the processing module and the power outputting module; and
- an output interface comprising a pogo pin, the pogo pin electrically connected to the first switch module; and an earphone detachably assembled in the charging box and selectively electrically connected to the pogo pin;

wherein, the earphone system includes a test mode and a communication mode; during the first identification time period when the earphone is assembled in the charging box and electrically connected to the pogo pin, the earphone system is in the test mode, the processing module controls the first switch module to switch to make the charging box transmit power to the earphone through the power outputting module, the first switch module and the pogo pin; after the earphone is assembled in the charging box and electrically connected to the pogo pin for more than the first identification time period, the earphone system is in the communication mode, the processing module controls the first switch module to switch to make the charging box transmit a data signal to the earphone through the processing module, the first switch module and the pogo pin.

2. The earphone system according to claim 1, wherein the earphone system further comprises N earphones, the charging box further comprises N first switch modules and N output interfaces, each of the N first switch modules is electrically connected to the processing module and the power outputting module respectively, the N first switch modules are electrically connected to N pogo pins of the N output interfaces in a one-to-one relationship, and the N pogo pins of the N output interfaces are selectively electrically connected to the N earphones in a one-to-one relationship, where N is an integer greater than or equal to 2.

3. The earphone system according to claim 1, wherein the earphone comprises a core module, a second switch module and a connection interface, the second switch module is electrically connected to the core module, and the connection interface is electrically connected to the second switch module and selectively electrically connected to the pogo pin; when the earphone system is in the test mode, the processing module controls the first switch module to make the pogo pin output the power transmitted by the power outputting module through the first switch module, and the core module controls the second switch module to make the connection interface receive the power from the pogo pin and transmit the power to the core module through the second switch module.

4. The earphone system according to claim 1, wherein the earphone comprises a core module, a second switch module and a connection interface, the second switch module is electrically connected to the core module, and the connection interface is electrically connected to the second switch module and selectively electrically connected to the pogo pin; when the earphone system is in the communication mode, the processing module controls the first switch module to make the pogo pin output the data signal transmitted by the processing module through the first switch module, and the core module controls the second switch module to make the connection interface receive the data signal from the pogo pin and transmit the data signal to the core module through the second switch module.

5. The earphone system according to claim 1, wherein the earphone system further includes a charging mode, and the processing module is further provided with a second identification time period; and after the second identification time period after the pogo pin of the charging box outputs the data signal, the earphone system is switched to be in the charging mode, and the processing module controls the first switch module to switch to make the pogo pin continue to output the power to the connection interface.

6. The earphone system according to claim 5, wherein the earphone comprises a core module, a second switch module and a connection interface, the second switch module is electrically connected to the core module, and the connection interface is electrically connected to the second switch module and selectively electrically connected to the pogo pin; when the earphone system is in the charging mode, the processing module controls the first switch module to make the pogo pin output the power transmitted by the power outputting module through the first switch module, and the core module controls the second switch module to make the connection interface receive the power from the pogo pin and transmit the power to the core module through the second switch module.

7. The earphone system according to claim 5, wherein the second identification time period is between 100 milliseconds (ms) and 1000 ms.

8. The earphone system according to claim 1, wherein the first switch module comprises a first switch unit and a second switch unit, the first switch unit is electrically connected to the processing module and the pogo pin, the second switch unit is electrically connected to the processing module, the power outputting module and the pogo pin, and the processing module controls turning-on and turning-off of the first switch unit and the second switch unit; when the earphone system is in the test mode, the processing module turns off the first switch unit and turns on the second switch unit; and when the earphone system is in the communication mode, the processing module turns on the first switch unit and turns off the second switch unit.

9. The earphone system according to claim 1, wherein the earphone comprises a core module and a second switch module, the second switch module is electrically connected to the core module; the core module comprises a control circuit and a charging circuit, the control circuit controls the second switch module and receives the data signal from the pogo pin, and the charging circuit receives the power from the pogo pin.

10. The earphone system according to claim 1, wherein the earphone comprises a core module, a second switch module and a connection interface, the connection interface is selectively electrically connected to the pogo pin; the second switch module comprises a third switch unit and a fourth switch unit, the third switch unit and the fourth switch unit are electrically connected the core module and the connection interface respectively, and the core module controls turning-on and turning-off of the third switch unit and the fourth switch unit; when the earphone system is in the test mode, the core module turns off the third switch unit and turns on the fourth switch unit to make the connection interface receive the power from the pogo pin and transmit the power to the core module through the fourth switch unit; and when the earphone system is in the communication mode, the core module turns on the third switch unit and turns off the fourth switch unit to make the connection interface receive the data signal from the pogo pin and transmit the data signal to the core module through the third switch unit.

11. The earphone system according to claim 1, wherein the charging box further comprises a magnetic unit, and the earphone further comprises a hall sensing unit; and when the hall sensing unit senses a magnetic field of the magnetic unit, the earphone determines that it is electrically connected to the charging box.

12. The earphone system according to claim 1, wherein the earphone further comprises a communication module, and the communication module transmits the data signal received by the earphone to an external device.

13. The earphone system according to claim 1, wherein the first identification time period is between 100 ms and 300 ms.

14. The earphone system according to claim 1, wherein the earphone further comprises a battery module, and the battery module stores the power received by the earphone.

15. A communication method between a charging box and an earphone, which comprising the following steps:

(A) putting the earphone into the charging box, and electrically connecting the earphone to a pogo pin of the charging box;

(B) during a first identification time period when the earphone is electrically connected to the pogo pin, an earphone system comprising the earphone and the charging box being in a test mode, and switching a first switch module in the charging box to make the pogo pin transmit power to the earphone;

(C) receiving the power from the pogo pin by the earphone when the earphone system being in the test mode;

(D) after the earphone being electrically connected to the pogo pin for more than the first identification time period, switching the earphone system to be in a communication mode, and switching the first switch module in the charging box to make the pogo pin transmit a data signal to the earphone; and (E) receiving the data signal from the pogo pin by the earphone and transmitting the data signal to an external device when the earphone system being in the communication mode.

16. The communication method according to claim 15, further comprising: after a second identification time period after the charging box outputs the data signal through the pogo pin, switching the earphone system to be in a charging mode, and switching the first switch module in the charging box to make the charging box continue to output the power to the earphone through the pogo pin.

17. The communication method according to claim 15, wherein the first switch module comprises a first switch unit and a second switch unit; and the earphone system being in the test mode, and switching the first switch module in the charging box to make the pogo pin transmit the power to the earphone in step (B) comprises:

turning off the first switch unit and turning on the second switch unit by the charging box to make the pogo pin transmit the power to the earphone through the second switch unit when the earphone system being in the test mode.

18. The communication method according to claim 15, wherein the first switch module comprises a first switch unit and a second switch unit, and switching the earphone system to be in the communication mode, and switching the first switch module in the charging box to make the pogo pin transmit the data signal to the earphone in step (D) comprises:

switching the earphone system to be in the communication mode, and turning on the first switch unit and turning off the second switch unit by the charging box to make the pogo pin transmit the data signal to the earphone through the first switch unit.

19. The communication method according to claim 15, wherein a second switch module is switched in the earphone to allow the earphone to receive the power from the pogo pin, the second switch module comprises a third switch unit and a fourth switch unit, and the step (C) comprises:

turning off the third switch unit and turning on the fourth switch unit by the earphone to make the earphone receive the power from the pogo pin through the fourth switch unit when the earphone system being in the test mode.

20. The communication method according to claim 15, wherein a second switch module is switched in the earphone allow the earphone to receive the data signal from the pogo pin and transmit the data signal to the external device, the second switch module comprises a third switch unit and a fourth switch unit, and the step (E) comprises:

turning on the third switch unit and turning off the fourth switch unit by the earphone to make the earphone receive the data signal from the pogo pin through the third switch unit and transmit the data signal to the external device when the earphone system being in the communication mode.

* * * * *